US012277557B2

(12) United States Patent
Gou

(10) Patent No.: US 12,277,557 B2
(45) Date of Patent: Apr. 15, 2025

(54) TRANSACTION TRACING METHOD AND APPARATUS BASED ON BLOCKCHAIN

(71) Applicants: Jingdong Technology Information Technology Co., Ltd., Beijing (CN); Jingdong Technology Holding Co., Ltd., Beijing (CN)

(72) Inventor: Xixia Gou, Beijing (CN)

(73) Assignees: Jingdong Technology Information Technology Co., Ltd., Beijing (CN); Jingdong Technology Holding Co., Ltd., Beijing (CN)

( * ) Notice: Subject to any disclaimer, the term of this patent is extended or adjusted under 35 U.S.C. 154(b) by 330 days.

(21) Appl. No.: 17/926,354

(22) PCT Filed: Apr. 27, 2021

(86) PCT No.: PCT/CN2021/090265
§ 371 (c)(1),
(2) Date: Nov. 18, 2022

(87) PCT Pub. No.: WO2021/233090
PCT Pub. Date: Nov. 25, 2021

(65) Prior Publication Data
US 2023/0196351 A1 Jun. 22, 2023

(30) Foreign Application Priority Data
May 19, 2020 (CN) .......................... 202010423858.4

(51) Int. Cl.
*H04L 9/00* (2022.01)
*G06F 21/60* (2013.01)
(Continued)

(52) U.S. Cl.
CPC ......... *G06Q 20/389* (2013.01); *G06F 21/602* (2013.01); *G06F 21/64* (2013.01);
(Continued)

(58) Field of Classification Search
CPC ...... G06Q 20/389; G06Q 20/401; H04L 9/50; H04L 9/065
(Continued)

(56) References Cited

U.S. PATENT DOCUMENTS

| 11,334,881 | B2 * | 5/2022 | Rangarajan ........ G06Q 20/3829 |
| 2018/0012311 | A1 | 1/2018 | Small et al. |

(Continued)

FOREIGN PATENT DOCUMENTS

| CN | 107911216 A | 4/2018 |
| CN | 108200079 A | 6/2018 |

(Continued)

OTHER PUBLICATIONS

Fan S. et al., "Research on Tracing Scheme of Medicine Based on Block Chain Technology", College of Cybersecurity, Journal of Chengdu University of Information Technology, Jun. 2019, vol. 34(3), 7 pages, (English abstract only).

(Continued)

*Primary Examiner* — Mohammad A. Nilforoush
*Assistant Examiner* — Wodajo Getachew
(74) *Attorney, Agent, or Firm* — Buchanan Ingersoll & Rooney, PC

(57) ABSTRACT

A method and an apparatus for tracing a transaction based on a blockchain are provided. The method may include: invoking a smart contract between an upstream node and an intermediate node; encrypting, by using a private key of the intermediate node, transaction details between the upstream node and the intermediate node to generate and write upstream transaction information into the blockchain; encrypting the private key of the intermediate node by respectively using public keys of the upstream node and an end node, and generating and writing secret-key information of the upstream node and the end node into the blockchain;

(Continued)

and decrypting the secret-key information of the upstream node and the end node by using the private keys of the upstream node and the end node, and decrypting the upstream transaction information of the intermediate node by using the private key of the intermediate node to obtain the transaction details.

17 Claims, 6 Drawing Sheets

(51) Int. Cl.
      *G06F 21/64*       (2013.01)
      *G06Q 20/38*       (2012.01)
      *G06Q 20/40*       (2012.01)
      *H04L 9/06*       (2006.01)
      *G06Q 30/06*       (2023.01)
      *G06Q 40/00*       (2023.01)
      *G06Q 40/04*       (2012.01)

(52) U.S. Cl.
    CPC ........... *G06Q 20/401* (2013.01); *H04L 9/065* (2013.01); *H04L 9/50* (2022.05); *G06Q 30/06* (2013.01); *G06Q 40/00* (2013.01); *G06Q 40/04* (2013.01); *H04L 2463/062* (2013.01)

(58) Field of Classification Search
    USPC .......................................................... 705/75
    See application file for complete search history.

(56) References Cited

U.S. PATENT DOCUMENTS

| | | | |
|---|---|---|---|
| 2018/0097635 A1* | 4/2018 | Moses | H04L 9/30 |
| 2018/0103042 A1* | 4/2018 | Castagna | H04L 63/0428 |
| 2018/0349896 A1 | 12/2018 | Arora et al. | |
| 2019/0013943 A1* | 1/2019 | Maim | H04L 9/30 |
| 2019/0087598 A1 | 3/2019 | Adkins et al. | |
| 2019/0132315 A1 | 5/2019 | Clark et al. | |
| 2019/0147397 A1 | 5/2019 | Hodges | |
| 2019/0253245 A1* | 8/2019 | Zhang | H04L 9/0637 |
| 2019/0370816 A1 | 12/2019 | Hu | |
| 2020/0084026 A1 | 3/2020 | Reading et al. | |
| 2021/0273785 A1* | 9/2021 | Higashikado | H04L 9/0819 |
| 2021/0273818 A1* | 9/2021 | Zhu | G06Q 30/06 |
| 2021/0320806 A1 | 10/2021 | Boudreault | |
| 2022/0006615 A1* | 1/2022 | Wright | H04L 9/3073 |
| 2022/0166634 A1 | 5/2022 | Zhu | |
| 2022/0376897 A1* | 11/2022 | Mackay | H04L 9/3236 |

FOREIGN PATENT DOCUMENTS

| | | | | |
|---|---|---|---|---|
| CN | 108616539 | A | | 10/2018 |
| CN | 108694594 | A | | 10/2018 |
| CN | 109523267 | A | | 3/2019 |
| CN | 110020538 | | * | 4/2019 |
| CN | 110046996 | A | | 7/2019 |
| CN | 110795752 | A | | 2/2020 |
| CN | 111598696 | A | | 8/2020 |
| JP | 2019520638 | A | | 7/2019 |
| JP | 2020536415 | A | | 12/2020 |
| KR | 20080010477 | A | * | 1/2008 |
| KR | 20190134296 | A | | 12/2019 |
| WO | 2017027648 | A1 | | 2/2017 |
| WO | 2019062530 | A1 | | 4/2019 |

OTHER PUBLICATIONS

International Search Report and Written Opinion for International Application No. PCT/CN2021/090265, dated Jul. 29, 2021, 9 pages.

* cited by examiner

TRANSACTION TRACING METHOD AND APPARATUS BASED ON BLOCKCHAIN

CROSS-REFERENCE TO RELATED APPLICATIONS

This patent application is a national stage of International Application No. PCT/CN2021/090265, filed on Apr. 27, 2021, which claims the priority of the Chinese patent application with the application number 202010423858.4, filed on May 19, 2020 and titled "Method and Apparatus for Tracing Transaction Based on Blockchain". Both of the aforementioned applications are hereby incorporated by reference in their entireties.

FIELD

Embodiments of the present disclosure relate to the field of computer technology, in particular, to a method and apparatus for tracing a transaction based on a blockchain.

BACKGROUND

Blockchain, the key technology behind the very popular Bitcoin, is a decentralized database. Information is distributed across the entire network rather than being stored by a single computer or data platform, making it less vulnerable to malicious attacks. Records of the blockchain are public and may be easily verified by anyone. Each transaction is stored on blocks, and each block contains a timestamp and a link to a previous block. If information is to be changed or removed, a same operation must be performed for posterior blocks. The blockchain acts as a complete record of all transactions on the chain, visible to all.

SUMMARY

Embodiments of the present disclosure propose a method and apparatus for tracing a transaction based on a blockchain.

In a first aspect, an embodiment of the present disclosure provides a method for tracing a transaction based on a blockchain, applied to an intermediate node, including: encrypting, by using a private key of the intermediate node, transaction details between an upstream node of the intermediate node and the intermediate node to generate upstream transaction information of the intermediate node, and writing the upstream transaction information into the blockchain; encrypting the private key of the intermediate node by respectively using a public key of the upstream node of the intermediate node and a public key of an end node, generating secret-key information of the upstream node of the intermediate node and secret-key information of the end node, and writing the secret-key information of the upstream node of the intermediate node and the secret-key information of the end node into the blockchain; invoking a smart contract between the intermediate node and a downstream node of the intermediate node; decrypting secret-key information of the intermediate node by using the private key of the intermediate node to obtain a private key of the downstream node of the intermediate node, where the secret-key information of the intermediate node is generated by the downstream node of the intermediate node by using a public key of the intermediate node to encrypt the private key of the downstream node of the intermediate node, and is written into the blockchain; and decrypting downstream transaction information by using the private key of the downstream node of the intermediate node to obtain transaction details between the intermediate node and the downstream node of the intermediate node, where the downstream transaction information is generated by the downstream node by using the private key of the downstream node to encrypt the transaction details between the intermediate node and the downstream node of the intermediate node, and is written into the blockchain.

According to a second aspect, an embodiment of the disclosure provides an apparatus for tracing a transaction based on a blockchain, including: one or more processors; a storage apparatus on which one or more programs are stored, where when the one or more programs are executed by the one or more processors, the one or more processors implement the method according to any one embodiment of the first aspect.

According to a third aspect, an embodiment of the present disclosure provides a non-transitory computer readable medium storing a computer program, where the method according to any one embodiment of the first aspect is implemented when the program is executed by a processor.

BRIEF DESCRIPTION OF THE DRAWINGS

After reading detailed descriptions of non-limiting embodiments with reference to the following accompanying drawings, other features, objectives, and advantages of the present disclosure will become more apparent.

DETAILED DESCRIPTION OF EMBODIMENTS

The present disclosure will be further described in detail below with reference to the accompanying drawings and embodiments. It should be understood that the specific embodiments described herein are only used to explain the related disclosure, but not to limit the present disclosure. In addition, it should be noted that, for the convenience of description, only the parts related to the related disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

In related art, there are many organizations involved in existing industrial transaction processes, lots of which are confirmed by using papers. The confirming process is cumbersome, no unified consortium has been formed, and data is not shared between the organizations.

The method and apparatus for tracing a transaction based on a blockchain provided by the embodiments of the present disclosure enable everyone to obtain real-time production data for free. One can easily chase regulatory compliance. Data may be shared seamlessly between joint ventures. Time to reach a protocol may be greatly reduced. Probably the most important is the disappearance of middlemen, which reduces the cost of each segment of the industry.

Figure 1:
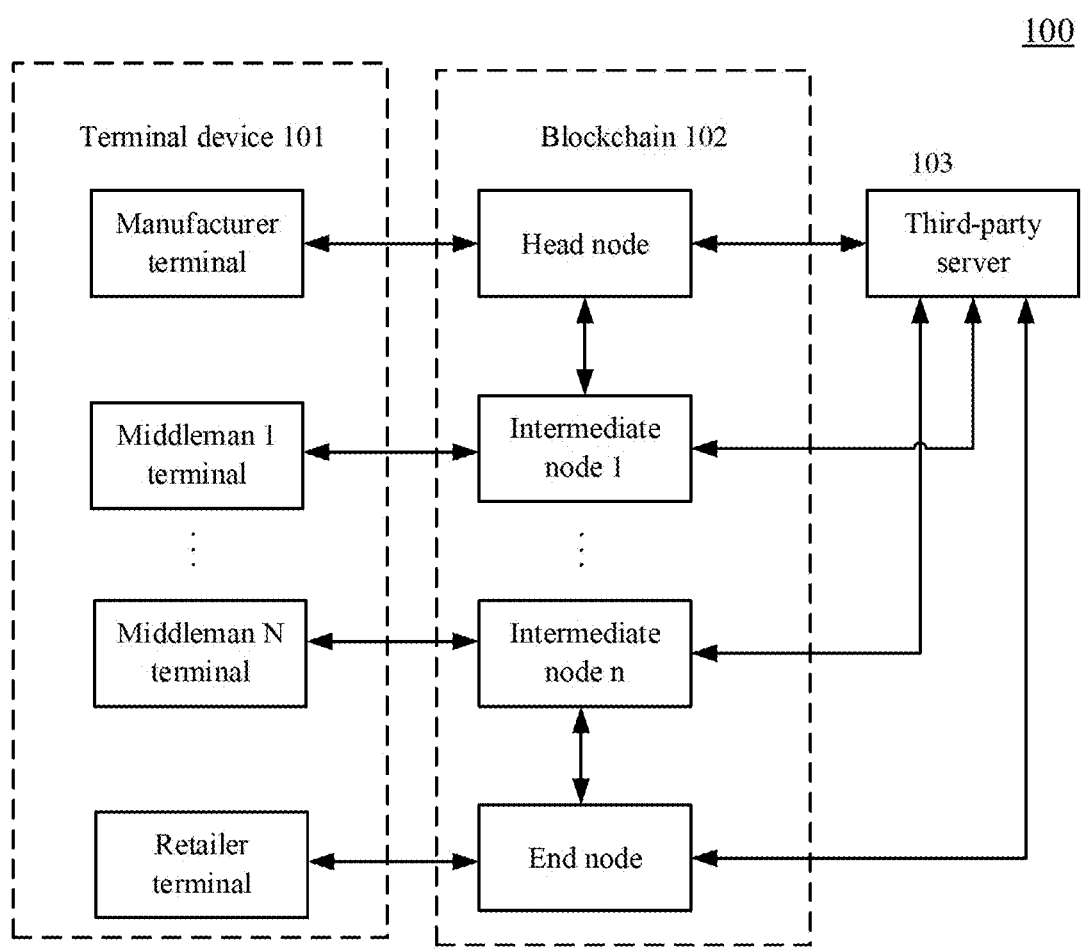
FIG. 1 is an example system architecture diagram to which an embodiment of the present disclosure may be applied.

FIG. 1 illustrates an example system architecture 100 to which embodiments of a method for tracing a transaction based on a blockchain or an apparatus for tracing a transaction based on a blockchain of the present disclosure may be applied.

As shown in FIG. 1, the system architecture 100 may include a terminal device 101, a blockchain 102, and a third-party server 103. The terminal device 101, the blockchain 102, and the third-party server 103 communicate through a network. The network may include various connection types, such as wired, wireless communication links, or the like.

A user may use the terminal device 101 to interact with the blockchain 102 and the third-party server 103 through the network to receive or send messages or the like. Various communication client applications may be installed on the terminal device 101, such as trade applications, web browser applications, shopping applications, search applications, instant messaging tools, email clients, or social platform software.

The terminal device 101 may be hardware or software. When the terminal device 101 is hardware, it may be various electronic devices that support transaction tracing. Each terminal device corresponds to a node, for example, the terminal device of a manufacturer corresponds to a head node, and the terminal device of a retailer corresponds to an end node. Nodes in a blockchain are arranged in the order of an industrial process.

The head node, an intermediate node 1 . . . an intermediate node n, and the end node as shown in FIG. 1 belong to the same trade organization. Transactions of each node within the trade organization are visible to an upstream node of the node, and the end node.

The third-party server 103 may provide node management functions, such as adding/deleting nodes, or assigning keys.

It should be noted that, the method for tracing a transaction based on a blockchain provided by the embodiments of the present disclosure is generally performed by the blockchain 102. Correspondingly, the apparatus for tracing a transaction based on a blockchain is generally provided in the blockchain 102.

It should be understood that the numbers of terminal devices, blockchains, and third-party servers in FIG. 1 are merely illustrative. According to implementation needs, there may be any number of terminal devices, blockchains, and third-party servers.

Figure 2:
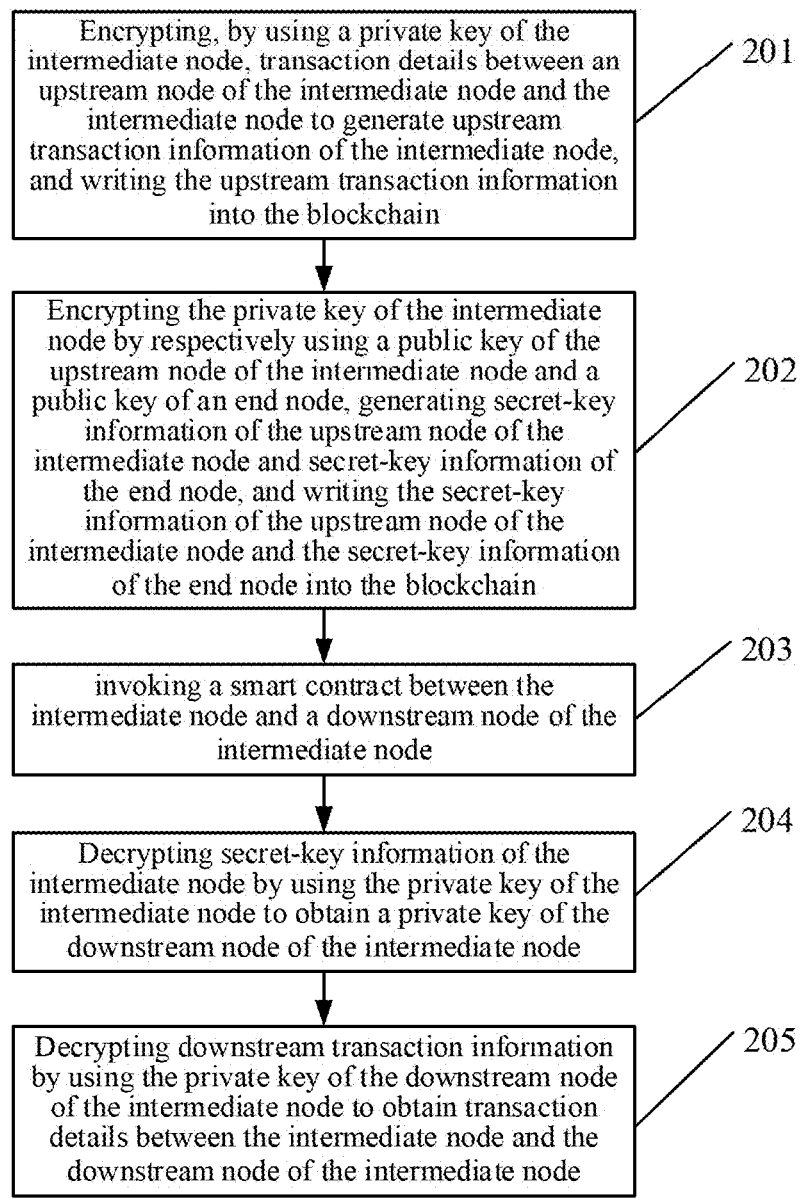
FIG. 2 is a flowchart of an embodiment of a method for tracing a transaction based on a blockchain, applied to an intermediate node, according to the present disclosure.

With further reference to FIG. 2, illustrating a flow 200 of an embodiment of a method for tracing a transaction based on a blockchain, applied to an intermediate node, according to the present disclosure. The method for tracing a transaction based on a blockchain includes the following steps.

Step 201 includes encrypting, by using a private key of the intermediate node, transaction details between an upstream node of the intermediate node and the intermediate node to generate upstream transaction information of the intermediate node, and writing the upstream transaction information into the blockchain.

In the present embodiment, an executing body (for example, the intermediate node shown in FIG. 1) of the method for tracing a transaction based on a blockchain may obtain the private key of this node from the third-party server. Each node has public key information corresponding to other nodes, and transmission of the public key information may use certificate authority (CA) or other approaches to ensure its security. Similarly, each node has private key information. Determinations involved in the process may be completed by a corresponding smart contract. In case of inconsistency, since each transaction has a signature of the writer, responsibility may be directly determined or an arbitration may be submitted.

This node uses its own private key to encrypt the transaction details (such as manufacturer information corresponding to the head node, middleman information corresponding to the intermediate node 1, goods name, goods ID (identification), goods quantity, or transaction time) between this node and the upstream node of this node to generate the upstream transaction information, and write the upstream transaction information into the blockchain.

Step 202 includes generating secret-key information of the upstream node of the intermediate node and secret-key information of the end node by encrypting the private key of the intermediate node by respectively using a public key of the upstream node of the intermediate node and a public key of an end node, and writing the secret-key information of the upstream node of the intermediate node and the secret-key information of the end node into the blockchain.

In the present embodiment, each node knows the public keys of other nodes, therefore, the public key of a target node may be used to perform the encryption, and the target node may perform decryption by using its own private key. Other non-target nodes cannot decrypt the encrypted content. Except for the head node, each node may share transaction information with its upstream node, may also share the information with the end node, and the end node summarizes the transaction information of all nodes. Therefore, for each intermediate node, the private key of the intermediate node is encrypted by respectively using the public key of the upstream node of the intermediate node and the public key of the end node. The secret-key information of the upstream node of the intermediate node and the secret-key information of the end node are generated and written into the blockchain.

Alternatively, a key-value approach may be used to write information into the chain, an ID (identification) of the upstream transaction information of the intermediate node is used as a key, and the secret-key information of the upstream node of the intermediate node and the secret-key information of the end node are used as values, and the key and the values are written into the blockchain. This makes it easy to find the secret key used to decrypt the transaction information.

Step 203 includes invoking a smart contract between the intermediate node and a downstream node of the intermediate node.

In the present embodiment, smart contract is a computer protocol designed to disseminate, verify or execute a contract in an information-based approach. Smart contract allows for trusted transactions without third parties, and these transactions are traceable and irreversible.

Step 204 includes decrypting secret-key information of the intermediate node by using the private key of the intermediate node to obtain a private key of the downstream node of the intermediate node.

In the present embodiment, the secret-key information of the intermediate node is generated by the downstream node of the intermediate node by using a public key of the intermediate node to encrypt the private key of the downstream node of the intermediate node, and is written into the blockchain. The intermediate node uses its own private key to decrypt the secret-key information of the intermediate node generated by other nodes (for example, the downstream node of the intermediate node), so as to obtain the private key of other nodes.

Step 205 includes decrypting downstream transaction information by using the private key of the downstream node of the intermediate node to obtain transaction details between the intermediate node and the downstream node of the intermediate node.

In the present embodiment, the downstream transaction information is generated by the downstream node by using the private key of the downstream node to encrypt the transaction details between the intermediate node and the downstream node of the intermediate node, and is written into the blockchain. Using the private key of other nodes (the downstream node of the intermediate node), the transaction information encrypted by the private key may be decrypted to obtain the transaction details.

Alternatively, for each intermediate node, the transaction details obtained by the intermediate node though decryption may be compared with transaction details locally recorded by the intermediate node to determine whether there is a difference. For example, transaction details obtained by the intermediate node 1 through decryption are recorded by intermediate node 2, so it is needed to compare the transaction details with transaction details recorded by the intermediate node 1 itself to check whether there is a difference.

Figure 3:
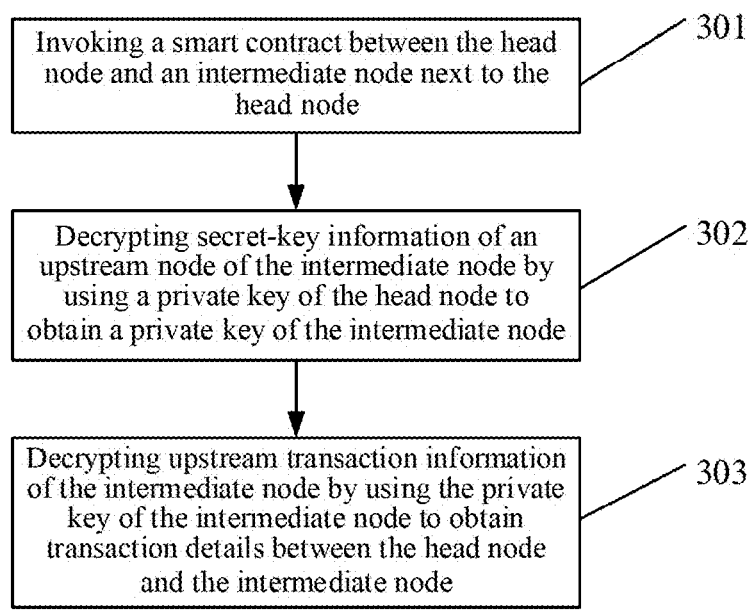
FIG. 3 is a flowchart of an embodiment of a method for tracing a transaction based on a blockchain, applied to a head node, according to the present disclosure.

With further reference to FIG. 3, a flow 300 of an embodiment of a method for tracing a transaction based on a blockchain, applied to a head node, according to the present disclosure is illustrated. The method for tracing a transaction based on a blockchain includes the following steps.

Step 301 includes invoking a smart contract between the head node and an intermediate node next to the head node.

In the present embodiment, an executing body (for example, the head node shown in FIG. 1) of the method for tracing a transaction based on a blockchain invokes the smart contract between the head node and the intermediate node 1. The head node is the node corresponding to a first stage in a trade process. The intermediate node 1 is the node corresponding to a second stage. Smart contract is a computer protocol designed to disseminate, verify or execute a contract in an information-based approach. Smart contract allows for trusted transactions without third parties and the trusted transactions are traceable and irreversible.

Step 302 includes decrypting secret-key information of an upstream node of the intermediate node by using a private key of the head node to obtain a private key of the intermediate node.

In the present embodiment, the secret-key information is written into the blockchain by the intermediate node through step 202. The secret-key information of the head node is generated by the intermediate node 1 by using a public key of the head node to encrypt the private key of the intermediate node 1, and is written into the blockchain. The head node uses its own private key to decrypt the secret-key information of the upstream node (head node) of the intermediate node 1 generated by the intermediate node 1, so as to obtain the private key of the intermediate node 1.

Step 303 includes decrypting upstream transaction information of the intermediate node by using the private key of the intermediate node to obtain transaction details between the head node and the intermediate node.

In the present embodiment, the upstream transaction information is written into the blockchain by the intermediate node through step 201. Using the private key of other nodes (for example, the intermediate node), the transaction information encrypted by the private key may be decrypted to obtain the transaction details.

Figure 4:
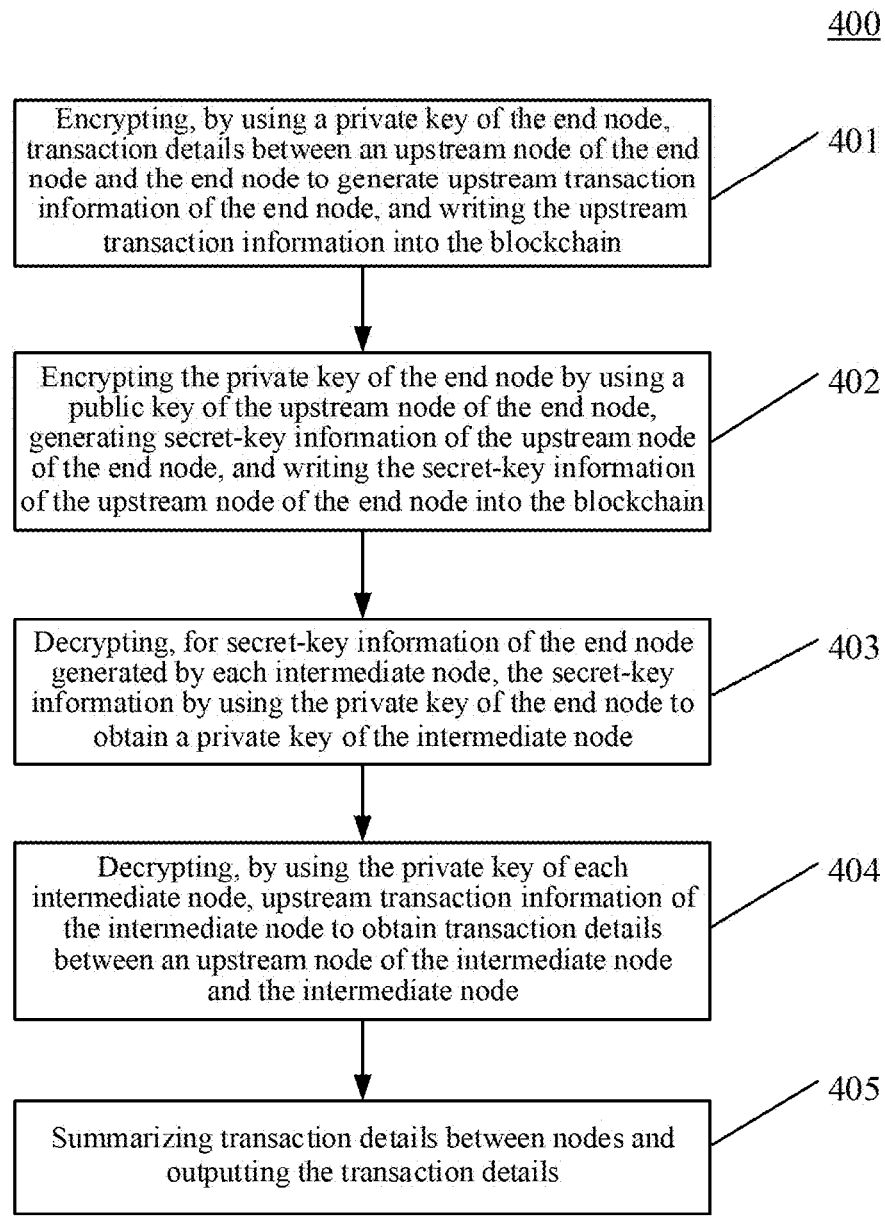
FIG. 4 is a flowchart of an embodiment of a method for tracing a transaction based on a blockchain, applied to an end node, according to the present disclosure.

With further reference to FIG. 4, a flow 400 of an embodiment of a method for tracing a transaction based on a blockchain, applied to an end node, according to the present disclosure is illustrated. The method for tracing a transaction based on a blockchain includes the following steps.

Step 401 includes encrypting, by using a private key of the end node, transaction details between an upstream node of the end node and the end node to generate upstream transaction information of the end node, and writing the upstream transaction information into the blockchain.

In the present embodiment, an executing body (for example, the end node shown in FIG. 1) of the method for tracing a transaction based on a blockchain may obtain the private key of this node from the third-party server. Each node has public key information corresponding to other nodes, and transmission of the public skey information may use certificate authority (CA) or other approaches to ensure its security. Similarly, each node has private key information, and determinations involved in the process may be completed by a corresponding smart contract. In case of inconsistency, since each transaction has a signature of the writer, responsibility may be directly determined, and an arbitration may be submitted.

This node (end node) uses its own private key to encrypt the transaction details (such as retailer information corresponding to the end node, middleman information corresponding to the intermediate node n, goods name, goods ID, goods quantity, or transaction time) between this node and the upstream node of this node to generate the upstream transaction information, and write the upstream transaction information into the blockchain.

Step 402 includes encrypting the private key of the end node by using a public key of the upstream node of the end node, generating secret-key information of the upstream node of the end node, and writing the secret-key information of the upstream node of the end node into the blockchain.

In the present embodiment, each node knows the public keys of other nodes, therefore, the public key of a target node may be used to perform encryption, and the target node may perform the decryption by using its own private key. Other non-target nodes cannot decrypt the encrypted content. This process is basically the same as step 202, except that secret-key information of the end node does not need to be generated again, and only the secret-key information of the upstream node of the intermediate node needs to be generated and written into the blockchain.

Alternatively, a key-value approach may be used to write information into the chain, an ID of the upstream transaction information of the end node is used as a key, and the secret-key information of the upstream node of the end node is used as values, and the key and the values are written into the blockchain. This makes it easy to find the secret key used to decrypt the transaction information.

Step 403 includes decrypting, for secret-key information of the end node generated by each intermediate node, the secret-key information by using the private key of the end node to obtain a private key of the intermediate node.

In the present embodiment, the executing body (for example, the end node shown in FIG. 1) of the method for tracing a transaction based on a blockchain may read the secret-key information written by each intermediate node through step 202 from the blockchain. That is, each piece of secret-key information corresponds to one intermediate node. For each piece of the secret-key information, the private key of the end node is used to decrypt the secret-key information to obtain the private key of the intermediate node corresponding to the secret-key information. Therefore, the end node may obtain the private keys of all intermediate nodes.

Step 404 includes decrypting, by using the private key of each intermediate node, upstream transaction information of the intermediate node to obtain transaction details between an upstream node of the intermediate node and the intermediate node.

In the present embodiment, the end node may read the upstream transaction information written by each intermediate node through step 201 from the blockchain. Each piece of upstream transaction information is encrypted by the private key of one intermediate node. For each piece of the upstream transaction information, the private key of the intermediate node obtained by decryption is used to decrypt the upstream transaction information to obtain the transaction details before encrypted by the intermediate node.

Step 405 includes summarizing transaction details between nodes and outputting the transaction details.

In the present embodiment, the transaction details between each intermediate node and the upstream node of the intermediate node, as well as the transaction details between the end node and the upstream node of the end node, may be summarized through a smart contract for summarizing data of stages.

Alternatively, generating a two-dimensional code for goods involved in the transaction details between the nodes; and binding the two-dimensional code to the transaction details between the nodes. Users may scan the two-dimensional code to obtain the transaction details between stages of the goods.

There are two types of smart contracts used in the present disclosure, one is a smart contract for the transaction between two parties, and the other is a smart contract for the retailer to summarize the data of stages at last. The logic of the two-party transaction smart contract is to generate a protocol file after an offline transaction between A and B. Here, the protocol file is invoked and protocol information is obtained. For the smart contract for the retailer to summarize the data of stages at last, the retailer acquires information of each step through the transaction ID and key, because the retailer has the data of all stages.

Figure 5:
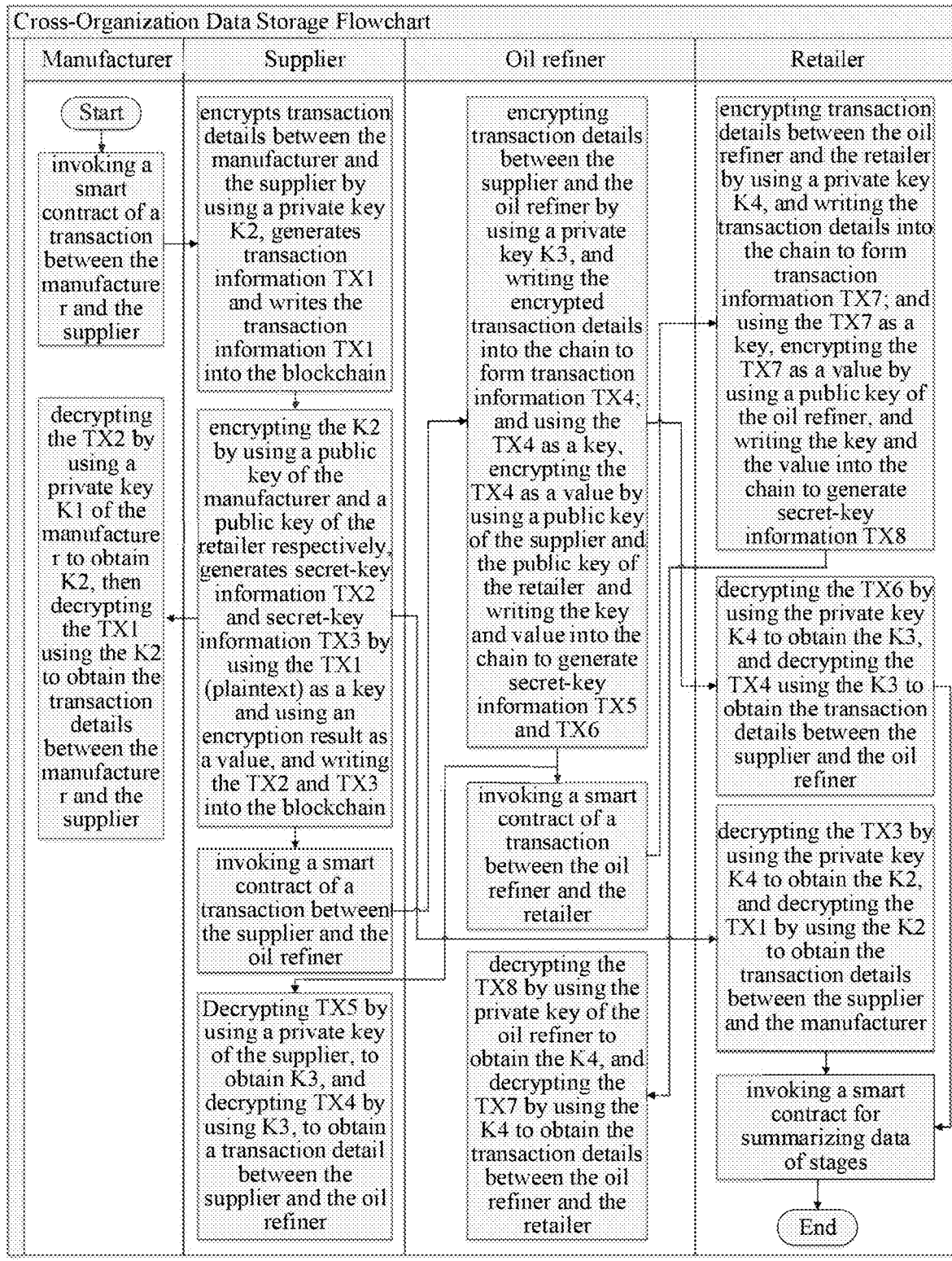
FIG. 5 is a schematic diagram of an application scenario of a system for tracing a transaction based on a blockchain according to the present disclosure.

With further reference to FIG. 5, FIG. 5 is a schematic diagram of an application scenario of the method for tracing a transaction based on a blockchain according to the present embodiment. In the application scenario of FIG. 5, oil trade is used as an example to introduce the method for tracing a transaction in detail, and the specific process is as follows.

1) Manufacturer (head node): invoking a smart contract of a transaction between the manufacturer and the supplier;
2) Supplier (intermediate node 1): encrypting transaction details between the manufacturer and the supplier (such as manufacturer information, supplier information, crude oil name, crude oil ID, crude oil quantity, or transaction time) by using a private key K2 of the supplier, generating transaction information TX1 and writing the transaction information TX1 into the blockchain;
3) Supplier (intermediate node 1): encrypting the K2 by using a public key of the manufacturer and a public key of the retailer respectively, generating secret-key information TX2 and secret-key information TX3 by using the TX1 (plaintext) as a key and using an encryption result as a value, and writing the TX2 and TX3 into the blockchain;
4) Manufacturer (head node): decrypting content of the TX2 by using a private key K1 of the manufacturer to obtain the K2, then decrypting the TX1 using the K2 to obtain the detailed events for a manufacturing supply protocol; and comparing the detailed events with transaction details recorded locally;
5) Supplier (intermediate node 1): invoking a smart contract of a transaction between the supplier and the oil refiner;
6) Oil refiner (intermediate node 2): encrypting (ciphertext) transaction details between the supplier and the oil refiner (such as supplier information, oil refiner information, crude oil product quantity, crude oil product price, or transaction time) by using a private key K3 of the oil refiner, and writing the encrypted transaction details into the chain to form transaction information TX4; and using the TX4 as a key, encrypting the TX4 as values by using a public key of the supplier and the public key of the retailer, and writing the key and the values into the chain to generate secret-key information TX5 and TX6;
7) Supplier (intermediate node 1): decrypting the TX5 by using the private key K2 of the supplier to obtain the private key K3 of the oil refiner, then decrypting the TX4 by using the private key K3 of the oil refiner to obtain the transaction details between the supplier and the oil refiner and comparing the obtained transaction details with transaction details recorded locally.
8) Oil refiner (intermediate node 2): invoking a smart contract of a transaction between the oil refiner and the retailer;
9) Retailer (end node): encrypting (ciphertext) transaction details between the oil refiner and the retailer (such as oil refiner information, retailer information, petroleum product ID, petroleum product quantity, petroleum product type, transaction price, or transaction time) by using a private key K4 of the retailer, and writing the transaction details into the chain to form transaction information TX7; and using TX7 as a key, encrypting the TX7 as a value by using a public key of the oil refiner, and writing the key and the value into the chain to generate secret-key information TX8;

10) Oil refiner (intermediate node 2): decrypting the TX8 by using the private key K3 of the oil refiner to obtain the K4, and decrypting the TX7 by using the K4 to obtain the transaction details between the oil refiner and the retailer; and comparing the obtained transaction details with transaction details recorded locally.

11) Retailer (end node): decrypting the TX6 by using the private key K4 of the retailer to obtain the K3, and decrypting the TX4 using the K3 to obtain the transaction details between the supplier and the oil refiner.

12) Retailer (end node): decrypting the TX3 by using the private key K4 of the retailer to obtain the K1, and decrypting the TX1 using the K1 to obtain the transaction details between the manufacturer and the supplier (manufacturer information, supplier information, crude oil product details);

13) Retailer (end node): invoking a smart contract for summarizing data of upstream stages.

The present disclosure uses the blockchain technology to form a consortium chain with organizations in the goods transaction process, and the organizations may act as nodes of a blockchain to form an automated transaction solution that is completely independent of third-party platforms.

1) By combining stages, nodes and the blockchain technology in a goods circulation process, and using the blockchain technology, the manufacturer, middlemen and retailer in the goods circulation process to form a consortium, the organizations act as nodes and participate in consensus, improving the reliability and accuracy of the process.

2) In the goods circulation process, secret-keys are used for permission control, so that the organizations can only view the data within the scope of their own authorities.

3) The smart contract is used to drive execution of the entire process, improving the automation of goods transaction, significantly improving the efficiency.

4) In the goods circulation process, if there is an addition or withdrawal of nodes, the designed smart contract is used for performing the control, which improves the flexibility of the consortium chain.

Figure 6:
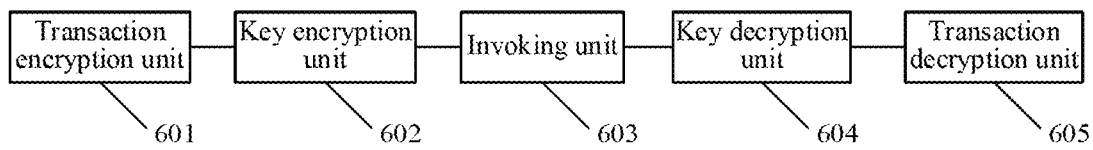
FIG. 6 is a schematic structural diagram of an embodiment of an apparatus for tracing a transaction based on a blockchain, applied to an intermediate node, according to the present disclosure.

With further reference to FIG. 6, as an implementation of the method shown in the above figures, the present disclosure provides an embodiment of an apparatus for tracing a transaction based on a blockchain, applied to an intermediate node. The apparatus embodiment corresponds to the method embodiment shown in FIG. 2. Particularly, the apparatus may be applied in various electronic devices.

As shown in FIG. 6, an apparatus 600 for tracing a transaction based on a blockchain of the present embodiment includes: a transaction encryption unit 601, a key encryption unit 602, an invoking unit 603, a key decryption unit 604, a transaction decryption unit 605. The transaction encryption unit 601 is configured to encrypt, by using a private key of the intermediate node, transaction details between an upstream node of the intermediate node and the intermediate node to generate upstream transaction information of the intermediate node, and write the upstream transaction information into the blockchain. The key encryption unit 602 is configured to encrypt the private key of the intermediate node by respectively using a public key of the upstream node of the intermediate node and a public key of an end node, generate secret-key information of the upstream node of the intermediate node and secret-key information of the end node, and write the secret-key information of the upstream node of the intermediate node and the secret-key information of the end node into the blockchain. The invoking unit 603 is configured to invoke a smart contract between the intermediate node and a downstream node of the intermediate node. The key decryption unit 604 is configured to decrypt secret-key information of the intermediate node by using the private key of the intermediate node to obtain a private key of the downstream node of the intermediate node, where the secret-key information of the intermediate node is generated by the downstream node of the intermediate node by using a public key of the intermediate node to encrypt the private key of the downstream node of the intermediate node, and is written into the blockchain. The transaction decryption unit 605 is configured to decrypt downstream transaction information by using the private key of the downstream node of the intermediate node to obtain transaction details between the intermediate node and the downstream node of the intermediate node, where the downstream transaction information is generated by the downstream node by using the private key of the downstream node to encrypt the transaction details between the intermediate node and the downstream node of the intermediate node, and is written into the blockchain.

In some alternative implementations of the present embodiment, the key encryption unit 602 is further configured to: use an ID of the upstream transaction information of the intermediate node as a key, and use the secret-key information of the upstream node of the intermediate node and the secret-key information of the end node as values, and write the key and the values into the blockchain.

In some alternative implementations of the present embodiment, the apparatus further includes a comparison unit (not shown in the accompanying drawings), configured to: compare the transaction details obtained by decrypting by the intermediate node with transaction details locally recorded by the intermediate node to determine whether there is a difference.

Figure 7:
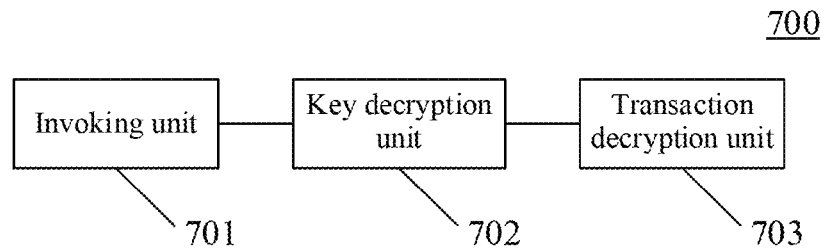
FIG. 7 is a schematic structural diagram of an embodiment of an apparatus for tracing a transaction based on a blockchain, applied to a head node, according to the present disclosure.

With further reference to FIG. 7, as an implementation of the method shown in the above figures, the present disclosure provides an embodiment of an apparatus for tracing a transaction based on a blockchain, applied to a head node. The apparatus embodiment corresponds to the method embodiment shown in FIG. 3. Particularly, the apparatus may be applied in various electronic devices.

As shown in FIG. 7, an apparatus 700 for tracing a transaction based on a blockchain of the present embodiment includes: an invoking unit 701, a key decryption unit 702, a transaction decryption unit 703. The invoking unit 701 is configured to invoke a smart contract between the head node and an intermediate node next to the head node. The key decryption unit 702 is configured to decrypt secret-key information of an upstream node of the intermediate node by using a private key of the head node to obtain a private key of the intermediate node, where the secret-key information is written into the blockchain by the intermediate node by using the method described in the first aspect. The transaction decryption unit 703 is configured to decrypt upstream transaction information of the intermediate node by using the private key of the intermediate node to obtain transaction details between the head node and the intermediate node, where the upstream transaction information is written into the blockchain by the intermediate node by using the method described in the first aspect.

Figure 8:
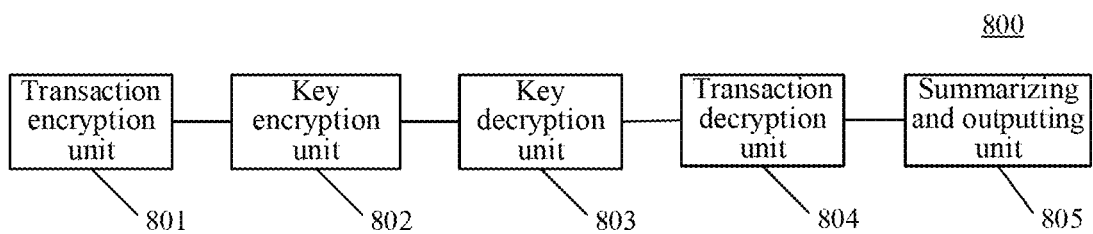
FIG. 8 is a schematic structural diagram of an embodiment of an apparatus for tracing a transaction based on a blockchain, applied to an end node, according to the present disclosure.

With further reference to FIG. 8, as an implementation of the method shown in the above figures, the present disclosure provides an embodiment of an apparatus for tracing a transaction based on a blockchain, applied to an end node. The apparatus embodiment corresponds to the method embodiment shown in FIG. 4. Particularly, the apparatus may be applied in various electronic devices.

As shown in FIG. 8, an apparatus 800 for tracing a transaction based on a blockchain of the present embodiment includes: a transaction encryption unit 801, a key encryption unit 802, a key decryption unit 803, a transaction decryption unit 804, a summarizing and outputting unit 805. The transaction encryption unit 801 is configured to encrypt, by using a private key of the end node, transaction details between an upstream node of the end node and the end node to generate upstream transaction information of the end node, and write the upstream transaction information into the blockchain. The key encryption unit 802 is configured to encrypt the private key of the end node by using a public key of the upstream node of the end node, generate secret-key information of the upstream node of the end node, and write the secret-key information of the upstream node of the end node into the blockchain. The key decryption unit 803 is configured to decrypt, for secret-key information of the end node generated by each intermediate node, the secret-key information by using the private key of the end node to obtain a private key of the intermediate node, where the secret-key information is written into the blockchain by each intermediate node by using the method described in the first aspect. The transaction decryption unit 804 is configured to decrypt, by using the private key of each intermediate node, upstream transaction information of the intermediate node to obtain transaction details between an upstream node of the intermediate node and the intermediate node, where the upstream transaction information is written into the blockchain by each intermediate node by using the method described in the first aspect. The summarizing and outputting unit 805 is configured to summarize transaction details between nodes and output the transaction details.

In some alternative implementations of the present embodiment, the apparatus further includes a two-dimensional code generating unit (not shown in the accompanying drawings) configured to: generate a two-dimensional code for goods involved in the transaction details between the nodes; and bind the two-dimensional code to the transaction details between the nodes.

Figure 9:
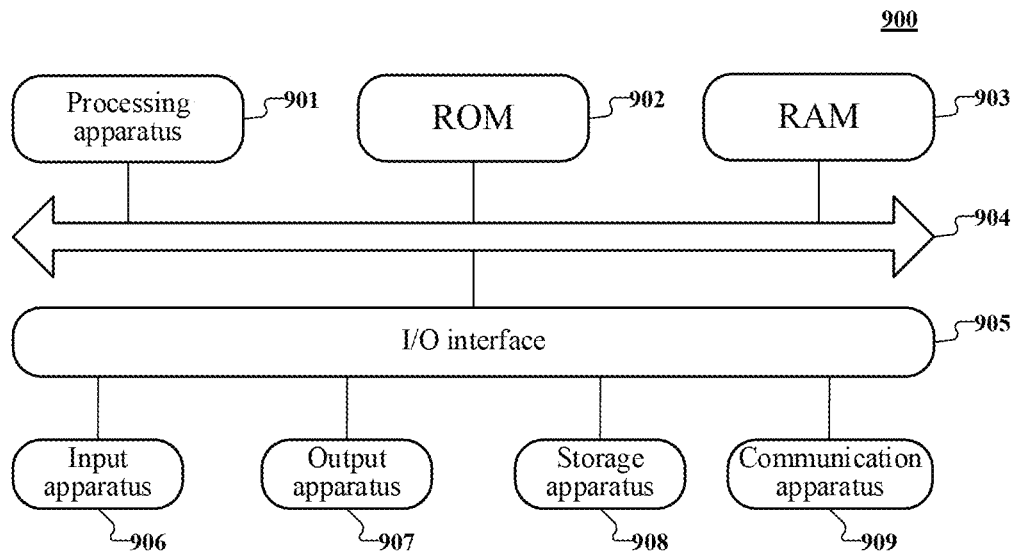
FIG. 9 is a schematic structural diagram of a computer system adapted for implementing an electronic device of an embodiment of the present disclosure.

Referring to FIG. 9, a schematic structural diagram of an electronic device (for example, the head node, the intermediate node, and the end node in FIG. 1) 900 adapted for implementing embodiments of the present disclosure is illustrated. The electronic device shown in FIG. 9 is merely an example, and should not bring any limitations to the functions and usage scope of the embodiments of the present disclosure.

As shown in FIG. 9, the electronic device 900 may include a processing apparatus (such as a central processing unit, a graphics processor) 901, which may execute various appropriate actions and processes in accordance with a program stored in a read-only memory (ROM) 902 or a program loaded into a random access memory (RAM) 903 from a storage apparatus 908. The RAM 903 also stores various programs and data required by operations of the electronic device 900. The processing apparatus 901, the ROM 902 and the RAM 903 are connected to each other through a bus 904. An input/output (I/O) interface 905 is also connected to the bus 904.

Generally, the following apparatuses may be connected to the I/O interface 905: an input apparatus 906 including a touch screen, a touch pad, a keyboard, a mouse, a camera, a microphone, an accelerometer, or a gyroscope; an output apparatus 907 including such as a liquid crystal display (LCD), a speaker, or a vibrator; the storage apparatus 908 including such as a magnetic tape, or a hard disk; and a communication apparatus 909. The communication apparatus 909 may allow the electronic device 900 to perform wireless or wired communication with other devices to exchange data. Although FIG. 9 shows the electronic device 900 having various apparatuses, it should be understood that it is not required to implement or have all the illustrated apparatuses. It may alternatively be implemented or provided with more or fewer apparatuses. Each block shown in FIG. 9 may represent one apparatus, or may represent a plurality of apparatuses as needed.

In particular, according to the embodiments of the present disclosure, the process described above with reference to the flow chart may be implemented as a computer software program. For example, the embodiments of the present disclosure include a computer program product, which includes a computer program that is tangibly embedded in a computer readable medium. The computer program includes a program code for executing the method as shown in the flow chart. In such an embodiment, the computer program may be downloaded and installed from a network via the communication apparatus 909, or may be installed from the storage apparatus 908, or may be installed from the ROM 902. The computer program, when executed by the processing apparatus 901, implements the above functions as defined by the method of the embodiments of the present disclosure. It should be noted that the computer readable medium of the embodiments of the present disclosure may be a computer readable signal medium or a computer readable storage medium, or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: an electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the embodiments of the present disclosure, the computer readable storage medium may be any tangible medium containing or storing programs which may be used by, or used in combination with, a command execution system, apparatus or element. In the embodiments of the present disclosure, the computer readable signal medium may include a data signal in the base band or propagating as a part of a carrier wave, in which a computer readable program code is carried. The propagating data signal may take various forms, including but not limited to an electromagnetic signal, an optical signal, or any suitable combination of the above. The computer readable signal medium may also be any computer readable medium except for the computer readable storage medium. The computer readable signal medium is capable of transmitting, propagating or transferring programs for use by, or use in combination with, a command execution system, apparatus or element. The program code contained on the computer readable medium may be transmitted with any suitable medium, including but not limited to: wire, an optical cable, a RF (radio frequency) medium etc., or any suitable combination of the above.

The computer readable medium may be included in the electronic device, or a stand-alone computer readable medium not assembled into the electronic device. The computer readable medium carries one or more programs. The one or more programs, when executed by the electronic device, cause the electronic device to: encrypt, by using a private key of the intermediate node, transaction details between an upstream node of the intermediate node and the intermediate node to generate upstream transaction information of the intermediate node, and write the upstream transaction information into the blockchain; encrypt the private key of the intermediate node by respectively using a public key of the upstream node of the intermediate node and a public key of an end node, generate secret-key information of the upstream node of the intermediate node and secret-key information of the end node, and write the secret-key information of the upstream node of the intermediate node and the secret-key information of the end node into the blockchain; invoke a smart contract between the intermediate node and a downstream node of the intermediate node; decrypt secret-key information of the intermediate node by using the private key of the intermediate node to obtain a private key of the downstream node of the intermediate node, where the secret-key information of the intermediate node is generated by the downstream node of the intermediate node by using a public key of the intermediate node to encrypt the private key of the downstream node of the intermediate node, and is written into the blockchain; and decrypt downstream transaction information by using the private key of the downstream node of the intermediate node to obtain transaction details between the intermediate node and the downstream node of the intermediate node, where the downstream transaction information is generated by the downstream node by using the private key of the downstream node to encrypt the transaction details between the intermediate node and the downstream node of the intermediate node, and is written into the blockchain.

A computer program code for executing operations in the embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the case where a remote computer is involved, the remote computer may be connected to a user computer through any kind of networks, including a local area network (LAN) or a wide area network (WAN), or may be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed substantially in parallel, or sometimes be executed in a reverse sequence, depending on the functions involved. It should also be noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor, for example, may be described as: a processor including a transaction encryption unit, a key encryption unit, an invoking unit, a key decryption unit, a transaction decryption unit. Here, the names of these units do not in some cases constitute limitations to such units themselves. For example, the transaction encryption unit may also be described as "a unit configured to encrypt, by using a private key of the intermediate node, transaction details between an upstream node of the intermediate node and the intermediate node to generate upstream transaction information of the intermediate node, and write the upstream transaction information into the blockchain".

The above description only provides explanation of the preferred embodiments and the employed technical principles of the present disclosure. It should be appreciated by those skilled in the art that the inventive scope of the present disclosure is not limited to the technical solutions formed by particular combinations of the above-described technical features, and should also cover other technical solutions formed by any combinations of the above-described technical features or equivalent features thereof without departing from the above inventive concepts, for example, technical solutions formed by interchanging the above-described features with, but not limited to, technical features with similar functions disclosed in the present disclosure.

What is claimed is:

1. A method for tracing a transaction based on a blockchain, applied to an intermediate node, comprising:
   encrypting, by the intermediate node using a private key of the intermediate node, transaction details between an upstream node of the intermediate node and the intermediate node to generate upstream transaction information of the intermediate node, and writing the upstream transaction information into the blockchain;
   encrypting, the intermediate node, the private key of the intermediate node by respectively using a public key of the upstream node of the intermediate node and a public key of an end node, generating secret-key information of the upstream node of the intermediate node and secret-key information of the end node, and writing the secret-key information of the upstream node of the intermediate node and the secret-key information of the end node into the blockchain;
   invoking, by the intermediate node, a smart contract between the intermediate node and a downstream node of the intermediate node;
   decrypting, by the intermediate node, secret-key information of the intermediate node by using the private key of the intermediate node to obtain a private key of the downstream node of the intermediate node, wherein the secret-key information of the intermediate node is generated by the downstream node of the intermediate node by using a public key of the intermediate node to encrypt the private key of the downstream node of the intermediate node, and is written into the blockchain; and decrypting, by the intermediate node, downstream transaction information by using the private key of the downstream node of the intermediate node to obtain transaction details between the intermediate node and the downstream node of the intermediate node, wherein the downstream transaction information is generated by the downstream node by using the private key of the downstream node to encrypt the transaction details between the intermediate node and the downstream node of the intermediate node, and is written into the blockchain.

2. The method according to claim 1, wherein writing the secret-key information of the upstream node of the intermediate node and the secret-key information of the end node into the blockchain, comprises:

using an ID of the upstream transaction information of the intermediate node as a key, and using the secret-key information of the upstream node of the intermediate node and the secret-key information of the end node as values and writing, by the intermediate node, the key and the values into the blockchain.

3. The method according to claim 1, wherein the method further comprises:

comparing the transaction details obtained by decrypting by the intermediate node with transaction details locally recorded by the intermediate node to determine whether there is a difference.

4. The method according to claim 1, wherein the intermediate node is an intermediate node next to a head node, and the method comprises:

invoking, by the head node, a smart contract between the head node and the intermediate node next to the head node;

decrypting, by the head node, the secret-key information of the upstream node of the intermediate node by using a private key of the head node to obtain the private key of the intermediate node; and decrypting, by the head node, the upstream transaction information of the intermediate node by using the private key of the intermediate node to obtain transaction details between the head node and the intermediate node.

5. The method according to claim 1, comprising:

encrypting, by an end node, using a private key of the end node, transaction details between an upstream node of the end node and the end node to generate upstream transaction information of the end node, and writing, by the end node, the upstream transaction information into the blockchain;

encrypting, by the end node, the private key of the end node by using a public key of the upstream node of the end node, generating, by the end node, secret-key information of the upstream node of the end node, and writing, by the end node, the secret-key information of the upstream node of the end node into the blockchain;

decrypting, by the end node, for secret-key information of the end node generated by each intermediate node, the secret-key information by using the private key of the end node to obtain the private key of the intermediate node;

decrypting, by the end node, using the private key of each intermediate node, the upstream transaction information of the intermediate node to obtain transaction details between an upstream node of the intermediate node and the intermediate node; and summarizing, by the end node, transaction details between nodes and outputting the transaction details.

6. The method according to claim 5, wherein the method further comprises:

generating, by the end node, a two-dimensional code for goods involved in the transaction details between the nodes; and binding, by the end node, the two-dimensional code to the transaction details between the nodes.

7. An apparatus for tracing a transaction based on a blockchain, applied to an intermediate node, comprising:

one or more intermediate node processors;

an intermediate node storage apparatus, storing at least one intermediate node instruction, wherein the at least one intermediate node instruction, when executed by the intermediate node processors, causes the one or more intermediate node processors to perform operations comprising:

encrypting, by using a private key of the intermediate node, transaction details between an upstream node of the intermediate node and the intermediate node to generate upstream transaction information of the intermediate node, and writing the upstream transaction information into the blockchain;

encrypting the private key of the intermediate node by respectively using a public key of the upstream node of the intermediate node and a public key of an end node, generating secret-key information of the upstream node of the intermediate node and secret-key information of the end node, and writing the secret key information of the upstream node of the intermediate node and the secret-key information of the end node into the blockchain;

invoking a smart contract between the intermediate node and a downstream node of the intermediate node;

decrypting secret-key information of the intermediate node by using the private key of the intermediate node to obtain a private key of the downstream node of the intermediate node, wherein the secret-key information of the intermediate node is generated by the downstream node of the intermediate node by using a public key of the intermediate node to encrypt the private key of the downstream node of the intermediate node, and is written into the blockchain; and decrypting downstream transaction information by using the private key of the downstream node of the intermediate node to obtain transaction details between the intermediate node and the downstream node of the intermediate node, wherein the downstream transaction information is generated by the downstream node by using the private key of the downstream node to encrypt the transaction details between the intermediate node and the downstream node of the intermediate node, and is written into the blockchain.

8. The apparatus according to claim 7, wherein the one or more intermediate node processors further perform operations comprising:

using an ID of the upstream transaction information of the intermediate node as a key, and using the secret-key information of the upstream node of the intermediate node and the secret-key information of the end node as values and writing the key and the values into the blockchain.

9. The apparatus according to claim 7, wherein the one or morn intermediate node processors further perform operations comprising:

comparing the transaction details obtained by decrypting the transaction details locally recorded by the intermediate node to determine whether there is a difference.

10. The apparatus according to claim 7, wherein the intermediate node is an intermediate node next to a head node, and wherein the apparatus further comprising:
one or more head node processors; a head node storage apparatus, storing at least one head node instruction, wherein the at least one head node instruction, when executed by the one or more head node processors, causes the one or more head node processors to perform operations comprising:
invoking a smart contract between the head node and the intermediate node next to the head node;
decrypting the secret-key information of the upstream node of the intermediate node by using a private key of the head node to obtain the private key of the intermediate node; and
decrypting the upstream transaction information of the intermediate node by using the private key of the intermediate node to obtain transaction details between the head node and the intermediate node.

11. The apparatus according to claim 7, wherein, the apparatus further comprises:
one or more end node processors;
an end node storage apparatus, storing at least one end node instruction, wherein the at least one end node instruction, when executed by the one or more end node processors, causes the one or more end node processors to perform operations comprising:
encrypting, by using a private key of the end node, transaction details between an upstream node of the end node and the end node to generate upstream transaction information of the end node, and writing the upstream transaction information into the blockchain;
encrypting the private key of the end node by using a public key of the upstream node of the end node, generating secret-key information of the upstream node of the end node, and writing the secret-key information of the upstream node of the end node into the blockchain;
decrypting, for secret-key information of the end node generated by each intermediate node, the secret-key information by using the private key of the end node to obtain the private key of the intermediate node;
decrypting, by using the private key of each intermediate node, the upstream transaction information of the intermediate node to obtain transaction details between an upstream node of the intermediate node and the intermediate node; and
summarizing transaction details between nodes and output the transaction details.

12. A system comprising a first non-transitory computer readable medium, storing a first computer program thereon, wherein, the first computer program, when executed by a first processor, causes the first processor to perform operations comprising:
encrypting, by using a private key of the intermediate node, transaction details between an upstream node of the intermediate node and the intermediate node to generate upstream transaction information of the intermediate node, and writing the upstream transaction information into the blockchain;
encrypting the private key of the intermediate node by respectively using a public key of the upstream node of the intermediate node and a public key of an end node, generating secret-key information of the upstream node of the intermediate node and secret-key information of the end node, and writing the secret-key information of the upstream node of the intermediate node and the secret-key information of the end node into the blockchain; invoking a smart contract between the intermediate node and a downstream node of the intermediate node;
decrypting secret-key information of the intermediate node by using the private key of the intermediate node to obtain a private key of the downstream node of the intermediate node, wherein the secret-key information of the intermediate node is generated by the downstream node of the intermediate node by using a public key of the intermediate node to encrypt the private key of the downstream node of the intermediate node, and is written into the blockchain; and
decrypting downstream transaction information by using the private key of the downstream node of the intermediate node to obtain transaction details between the intermediate node and the downstream node of the intermediate node, wherein the downstream transaction information is generated by the downstream node by using the private key of the downstream node to encrypt the transaction details between the intermediate node and the downstream node of the intermediate node, and is written into the blockchain.

13. The system according to claim 12, wherein the first processor further performing operations comprising:
using an ID of the upstream transaction information of the intermediate node as a key, and using the secret-key information of the upstream node of the intermediate node and the secret-key information of the end node as values and
writing the key and the values into the blockchain.

14. The system according to claim 12, wherein the first processor further perform operations comprising:
comparing the transaction details obtained by decrypting transaction details locally recorded by the intermediate node to determine whether there is a difference.

15. The system according to claim 12, further comprising a second non-transitory computer readable medium, storing a second computer program thereon, wherein, the second computer program, when executed by a second processor, causes the second processor to perform operations comprising:
invoking a smart contract between a head node and the intermediate node next to the head node;
decrypting the secret-key information of the upstream node of the intermediate node by using a private key of the head node to obtain the private key of the intermediate node; and
decrypting the upstream transaction information of the intermediate node by using the private key of the intermediate node to obtain transaction details between the head node and the intermediate node.

16. The system according to claim 12, further comprising a third non-transitory computer readable medium, storing a third computer program thereon, wherein, the third computer program, when executed by a third processor, causes the third processor to perform operations comprising wherein:
encrypting, by using a private key of the end node, transaction details between an upstream node of the end node and the end node to generate upstream transaction information of the end node, and writing the upstream transaction information into the blockchain;

encrypting the private key of the end node by using a public key of the upstream node of the end node, generating secret-key information of the upstream node of the end node, and writing the secret-key information of the upstream node of the end node into the blockchain;

decrypting, for secret-key information of the end node generated by each intermediate node, the secret-key information by using the private key of the end node to obtain the private key of the intermediate node;

decrypting, by using the private key of each intermediate node, the upstream transaction information of the intermediate node to obtain transaction details between an upstream node of the intermediate node and the intermediate node; and summarizing transaction details between nodes and output the transaction details.

17. The system according to claim 16, wherein the third processor perform operations comprising:

generating a two-dimensional code for goods involved in the transaction details between the nodes; and binding the two-dimensional code to the transaction details between the nodes.

* * * * *